United States Patent [19]
Foster

[11] 3,911,445
[45] Oct. 7, 1975

[54] INK DROP STREAM INTEGRITY CHECKER IN AN INK JET PRINTER

[75] Inventor: John E. Foster, Glenview, Ill.

[73] Assignee: A. B. Dick Company, Chicago, Ill.

[22] Filed: Sept. 25, 1974

[21] Appl. No.: 509,066

[52] U.S. Cl. ................................. 346/1; 346/75
[51] Int. Cl.² ................................. G01D 15/18
[58] Field of Search ......................... 346/75, 1

[56] References Cited
UNITED STATES PATENTS
3,852,768  12/1974  Carmichael .................. 346/75
3,866,237   2/1975  Meier ......................... 346/75

OTHER PUBLICATIONS
Fillmore et al., Deflection Servo Initialization; IBM Tech. Disc. Bulletin, Vol. 16, No. 3, August 1973, pp. 1031–1033.

Primary Examiner—Joseph W. Hartary
Attorney, Agent, or Firm—Lindenberg, Freilich, Wasserman, Rosen & Fernandez

[57] ABSTRACT

In an ink jet printer of the type which projects varying charge drops through a pair of deflection plates at a substrate, the determination as to whether a drop stream passing between the deflection plates is properly located, can be made, by sensing the modulation of the electric field between the deflection plates by the drop stream passing therethrough and comparing the sensed signal with a reference.

7 Claims, 5 Drawing Figures

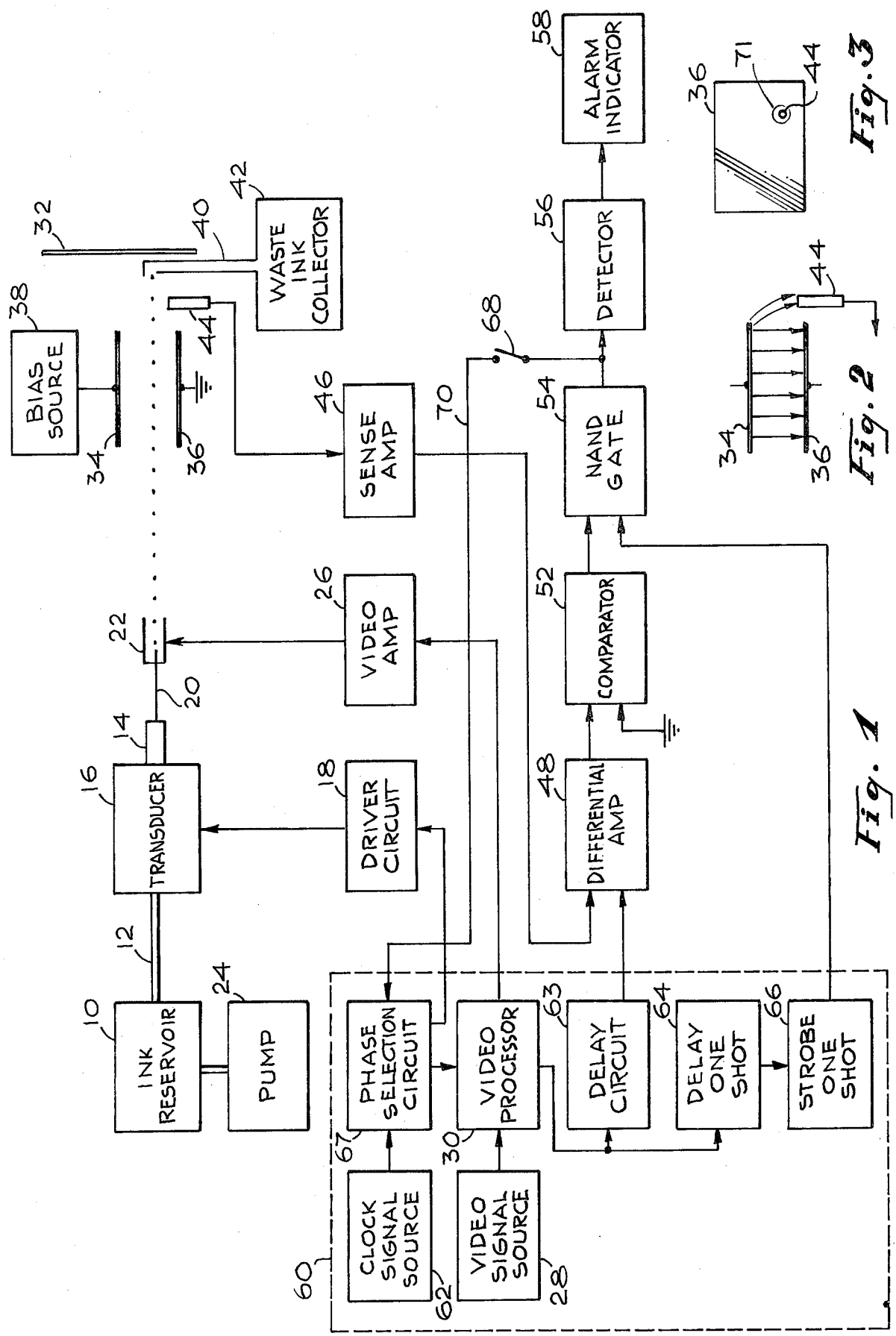

INK DROP STREAM INTEGRITY CHECKER IN AN INK JET PRINTER

BACKGROUND OF THE INVENTION

This invention relates to ink jet writing systems and more particularly to improvements therein.

An ink jet printer projects ink droplets in a stream through deflection electrodes toward paper on which the printing is to occur. Those ink droplets which are not to be deposited on the paper are directed at a catcher on the paper side of the electrodes. It is important to verify whether or not the streams of the droplets are behaving correctly, since for example, if the uncharged droplets are not being caught by the waste catcher, they can create an unwanted mess. Also, obviously if because of some defect in the charging or synchronizing circuits which are used in ink drop stream does not follow the desired projectory poor printing can result.

In the prior art, a U.S. Pat. No. 3,681,778 and a U.S. Pat. No. 3,562,761 show how to correct incorrect drop phasing by intercepting charged drops and sensing the charge amplitude. A U.S. Pat. No. 3,769,632 teaches inductively sensing drop charges. The disadvantages to these approaches is that in one instance the drops have to be caught to obtain their charge and this cannot be done during printing. As for measuring an induced charge, this requires working at a very low signal level and the drops must be passed close to the probe, which cannot be accomplished during printing. Further, in all the above examples, during periods when it is not desired to charge the stream, no information is gained.

OBJECTS AND SUMMARY OF THE INVENTION

An object of this invention is to provide a method and means for detecting the behavior of an ink drop stream passing through an electric field whether or not the drops in the stream are charged.

Another object of this invention is to provide a novel method and means for determining the location of an ink drop stream while passing through an electric field.

Yet another object of this invention is the provision of a novel and useful method and means for checking ink drop stream behavior in passing through an electric field which can be used while the printing operation is going on.

The foregoing and other objects of the invention are achieved by placing a sensing probe within the electric field through which an ink droplet stream passes at a location relative to the ink stream so that, as the ink stream passes through the field, the electric field terminating on the probe is modified by the presence of the ink stream. The surface charge at the sensing probe will vary considerably, depending on the path the ink stream takes (i.e., by the distance the stream passes above the probe). The charge variation at the probe gives rise to a current which can be converted into a voltage. This voltage can be compared to a reference voltage to determine, for example, whether, for the particular charging voltages being applied to the ink drop stream at the time, the stream is properly located within the field. If it is not, then the output of the comparator which is used can be used to either perform a correction or provide an alarm indicating a malfunction.

The novel features of the invention are set forth with particularity in the appended claims. The invention will be best understood from the following description when read in conjunction with the accompanying drawings.

BRIEF DESCRIPTION OF THE DRAWINGS

FIG. 1 is a block schematic diagram of an ink jet printing system incorporating an embodiment of the invention.

FIG. 2 schematically illustrates the determination of field lines on a sensing probe, in accordance with this invention.

FIG. 3 illustrates alternate placement of a sensing probe with respect to deflection plates, in accordance with this invention.

DESCRIPTION OF THE PREFERRED EMBODIMENTS

Figures 4, 5:
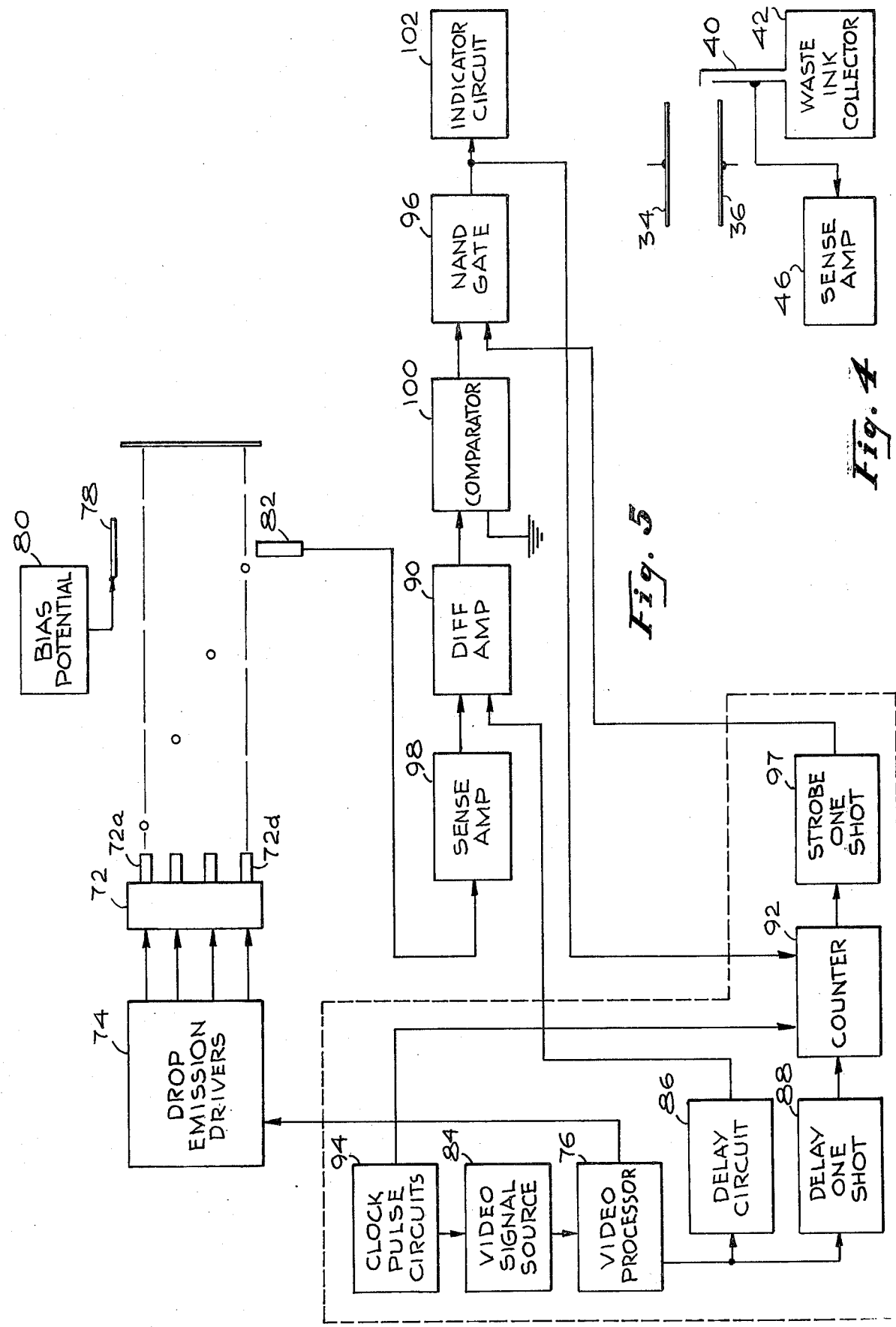
FIG. 4 is a fragmentary schematic diagram illustrating still another embodiment of this invention.
FIG. 5 illustrates still another embodiment of this invention.

Referring now to FIG. 1, there may be seen a schematic representation of an ink jet printing system to which an embodiment of this invention has been applied. Illustrative of an ink jet system, there is usually provided a pressure regulated ink reservoir 10 to which a pipe 12 is connected terminating in a nozzle 14. A transducer 16, driven by signals from a driver circuit 18, vibrates the nozzle so that an ink stream 20, which is emitted from the nozzle 14, will break down into ink drops within a charging tunnel 22. The ink reservoir may contain ink under pressure which is provided by an air pump 24. The pressure of the ink in the ink reservoir is what projects the ink through the tube 12 and out of the nozzle 14.

As the ink drops begin to separate from the ink stream within the charging tunnel, each drop receives an induced charge, which is applied to the charging tunnel from a video amplifier 26. The signals applied to the video amplifier are derived from a source of data signals 28 which are converted by a suitable character generator or video processor 30 into signals which are amplified and then are applied to the charging tunnel, whereby each drop receives a charge, so that it will be directed to a proper location on a paper 32 to effectuate printing.

As the ink drops pass out of the charging tunnel 22, they pass between a pair of deflection plates respectively 34, 36. These plates have a bias potential applied thereto from a bias potential source 38, so that effectively each charged drop passes through the electric field established between these plates and is deflected by an amount determined by the charge on the drop.

Uncharged drops or drops that are not required for writing are directed toward the nozzle 40 of a waste catcher 42, which collects this unused ink and can return it to the ink reservoir.

As briefly thus far described, the ink jet printing system is well known and will be found described, for example, in the patents mentioned previously.

In accordance with this invention, a sensing probe 44, is placed adjacent an end of the lower deflection electrode 36, so that some of the field lines will terminate on its surface. This is shown in FIG. 2 which is an enlarged view of the downstream end of the deflection plates and a sensing probe adjacent thereto. The arrows shown in the drawing represent field lines and, as may be seen in the drawing, some of these field lines terminate on the conductive sensing probe. As an ink stream passes through the field above the probe, the electric field is interrupted or modified by the presence of the ink. In particular, if the ink is somewhat conductive, as is commonly the case, the field and hence the surface charge at the sensing probe will vary considerably, depending on the path the ink stream takes, for example, depending on the distance the stream passes above the probe. Variation of charge at the surface of the probe in turn can give rise to a current flow to and from a sensing amplifier 46, connected thereto. To those familiar with static field mapping, (see for example "Electromagnetics" J. D. Krauss, McGraw-Hill, 1953, Sections 2-27), the charge displacement at the probe can be determined for any position of the ink stream.

A sense amplifier 46 converts the current generated into a voltage, which is applied as one input to a differential amplifier 48. The other input to the differential amplifier is a reference signal supplied as is further explained hereinafter. The output from the differential amplifier is applied to a comparator 52. The comparator operates in a manner such that its output is low if the difference between its inputs is within a predetermined tolerance and its output is high if the difference between its inputs is outside of tolerance. The other input to the comparator 52 is held at ground (reference) level.

Comparator 52 drives one input of a Nand gate 54. When enabled, the output of Nand gate 54 drives a detector circuit 56 which in turn drives an alarm indicator circuit 58.

An arrangement of circuits designated as control logic circuits 60, synchronizes and controls the printing and checking functions. A clock signal source 62, the video signal source 28, and the video processor 30 are circuits analagous to those shown in FIG. 1 of U.S. Pat. No. 3,681,778 in which the corresponding numbers are 16, 10 and 12 respectively. "Phase selection circuits 64" comprise circuits similar in function to circuits 14, 18, 20, 60, 62, 64, 66, and 68 in FIG. 1 of U.S. Pat. No. 3,681,778 which cooperate in response to a triggering signal to shift the phase of the driver circuit 18 output in the manner shown and described in that patent.

Herein, the signals from the source of video signals 28 are applied to the video processor 30 which converts the video signals into a train of video pulses whose amplitude, after passing through video amp 26, determine where the drops will be deposited on paper. Video signal source 28 can, of course, output test characters (e.g., a vertical stroke) as well as characters for normal printing. Another output is derived from the video processor. This is a pulse (or train of pulses) whose amplitude is related to the main video pulse and which acts as a reference signal after passing through a Delay Circuit 63. Video Processor 30 may be programmed such that when certain selected pulses are applied to Video Amplifier 28 another pulse is applied to a delay circuit 63 and also to a delay one shot circuit 64. The magnitude of the reference pulse is such as to be equal to the output from sense amplifier 46 when the ink drops are being properly charged and deflected so that they pass sensing probe 44 in the correct spatial relationship.

The video processor 30 is normally a character generator which converts the video signals from the source 28 into a train of pulses whose amplitudes are such that drops charged in accordance with the train of pulses will print characters represented by the video signals. For the purposes of this invention the video processor will comprise what may be called two "character generators." One of these will produce, in response to video signals, a train of pulses of the type just mentioned. The other will produce, in response to all video signals, or in response to predesignated video signals, a train of pulses which are used as reference signals. The amplitudes at which these reference signals are established are previously determined by measuring the outputs of the sense amplifier 46, when the system is printing correctly in response to the video signal input. Thus the two character generators in the video processor 30 in response to a single input from the video signal source simultaneously produce two outputs, one to the video amplifier 26, and the other to the delay circuit 63 and to the delay one shot 64.

In addition to passing through delay circuit 63, the reference pulse also triggers delay one shot circuit 64, whose output in turn triggers a stroke circuit one shot 66. The purpose of delay circuit 63 and delay one shot 66 is to compensate for the time of flight of the ink drops between charging tunnel 22 and sense probe 44 so that a time coincident comparison can be effected at the inputs to differential amplifier 48.

As mentioned heretofore, comparator 52 provides one input to Nand gate 54. The other input to the Nand gate 54 is the output of strobe circuit 66 which can precisely enable Nand gate 54 at the desired time for checking. If the output of comparator 52 is high when the strobe enables Nand gate 54, the Nand gate 54 provides an output to the detector 56. The output of the detector can actuate the alarm indicator 58, or, if desired, can automatically turn off the ink jet system.

The low output of comparator 48 occurs while the system is operating properly. That is, the output from differential amplifier 48 is near zero at strobe time since the sense amplifier output 46 is equal to the reference signal—indicating that the ink stream is at the proper location within the deflection field. Under this condition NAND gate 54 will not provide an output at strobe time, since the output from comparator 52 is low. However, should comparator 52 have a high output caused by an inequality of the inputs to amplifier 48 when NAND gate 54 is enabled by the strobe, its output goes low and detector 56 detects this fact and provides the alarm and such other operations as are desired.

It will be appreciated that the reference signal can be set at whatever test value it is desired to check the ink jet stream. For example, if it is desired to see whether or not the ink stream is being adequately deflected, then the output of the video signal circuit 28 is set at the maximum video signal charging level, the reference signal is set at a value equal to the output of the sense amplifier 46 when the jet stream is indeed deflected to its maximum (correct) value. This kind of checking can go on while the system is operating, it only being necessary, for each check, that the reference signal be such that the comparator will produce a "good" comparison, if the ink stream is indeed at the proper location. In short, the checking of the displacement of the stream can be accomplished by test signals or by the actual act of printing since, as the stream is deflected by the electronic command applied to the charge tunnel, an expected result at the output of the comparator can be looked for which will verify the proper action of the stream. Failure to obtain the expected sense signals can initiate whatever action is required for making a correction.

One action which may be taken, other than the ones indicated is to feed back the output of the NAND gate 54, which occurs when the ink stream is not being properly deflected. By closing a switch 68 a line 70 connects the output of NAND gate 54 to the phase selection circuit 67. As previously indicated the phase selection circuit is a circuit arrangement such as is shown in U.S. Pat. No. 3,681,778, wherein the relative phasing of the ink drop charge signal is corrected by setting or resetting a flip-flop in response to a triggering signal. Here the signal which sets or resets a flip flop for altering the relative phasing between signals of the driver circuit 18 and the video amp 26 is the output of the NAND gate 54.

FIG. 3 illustrates an alternative placement of the sensing probe. There is shown a view in elevation of the bottom electrode 36. It has a hole 71 therein in which the sensing probe 44 is placed.

If desired, the waste catcher tube 40 may be used as a sensing probe. This may be accomplished by making it conductive. FIG. 4 schematically represents this. The waste catcher tube 40 here is conductive and it is connected to the sense amplifier 44. Thereby the signal that is sensed will not only be the charge signal on the drops at the time they impact the waste catcher but also the signal caused by the modulation of the electric field by the ink stream passing therethrough.

As thus far discussed, the invention has been described as being used in connection with detecting whether or not a stream of ink drops is behaving properly as it is passing through an electric field. A "single gun" ink jet printer has been described. This method of verifying ink stream integrity is also applicable to multistream printers in which the streams are not charged or deflected. An arrangement for doing this is represented schematically in FIG. 5. An ink drop printing head 72 is schematically represented wherein, by way of example, four nozzles 72a through 72d are shown, which are selectively energizable to provide streams of ink drops in manner well known to the art, in response to signals from drop emission driver circuit 74. Drop emission driver circuit 74 represents the known circuits for driving the ink drop generators in the printing head 72 in response to signals from a video processor 76. While, in an ink jet printing system of this type, deflection plates are not used since the ink drops are not charged, for the purposes of testing in accordance with the invention, a bias plate 78 is provided and a bias potential source 80 applies potential between the bias plate and a sensing probe 82 to establish an electric field between the plate and the sensing probe.

For purposes of test, a video signal source 84 instructs the video processor 76 to print a "test" character, for example, the letter I or a vertical stroke. Video processor 76 thereupon emits a sequence of pulses to emission drivers 74 which cause a sequence of drops to be generated by print head 72. The action may thus be that of normal printing if the drops are normally released sequentially or this may be effected by the video processor for test characters where the drops are normally released in parallel during printing. In addition to the pulses sent to emission drivers 74, video processor 76 also sends a sequence of reference pulses to a delay circuit 86 and to a delay one shot 88. These reference pulses after passing through delay circuit 86 are applied as a reference signal to the input of a differential amplifier 90. The reference pulses also trigger the delay one shot 88 which, after timing out enables counter 92 to count a clock input from a clock pulse circuit 94. Counter 92 is a cyclic counter and will count up to the number of reference pulses in the pulse train and reset unless it is stopped by an input from a NAND gate 96. For each count output of the counter, a strobe pulse is generated by strobe one shot 97.

As the drops from each nozzle, in turn, pass the sensing probe 82, the modulation of the electric field caused by the passage of the drop streams is detected. The sensing probe output is applied to a sense amplifier 98 to be converted into a representative voltage in a manner described in connection with sense amplifier 46 shown in FIG. 1. The output of the sense amplifier 98 is applied to the differential amplifier 90 whose other input is the reference signal output of the delay circuit 86. The differential amplifier output serves as one input to a comparator 100 whose other input is at ground reference. The output of comparator 100 is one input to NAND gate 96. Its other input is a strobe signal from a strobe circuit 97. The strobe circuit is driven by count signals from counter 92, as previously described.

It should be clear that the operation of the comparison circuits including differential amplifier 90, comparator 100 and NAND gate 96, to determine the integrity of each drop stream emitted by the head 63 is the same as the circuits 48, 52 and 54 in FIG. 1. Indicator circuit 102 provides an alarm in response to an output from NAND gate 96 and the counter 92 is stopped. Its count indicates which nozzle is not functioning properly. The nozzles 72a-72d are thus checked sequentially (one at a time in simplest form) for their proper operation. To the extent that the printed drops can be so sequenced (e.g., where the medium being printed upon is stationary or moving relatively slowly), it is clear that the drops can also be checked during actual printing.

Because of the fact that the ink stream is modulating a strong electric field, a charge induced into the sensing electrode can be much greater than that carried by the ink drops themselves. It should be appreciated that not only will the invention detect the wrong position of an ink stream passing through the electric field, but in the event that a nozzle is clogged, so that no ink stream appears, this to is detected, since a nonappearing ink stream will cause triggering of the alarm circuits just like an erroneously positioned ink stream causes such triggering.

There has therefore been described and shown herein a means for detecting position changes of an ink jet stream printer by sensing charge flow using a sensing probe. The sensing probe does not contact the stream and is actuated by modulation of the static electric field caused by the stream passing therethrough. The signal obtained at the probe is deterministically related to input signals and can thus be used to verify proper action of the stream or to allow corrective action while in a testing or in a printing mode. Detrimental changes to the ink jet printer such as loss of the high voltage field, partial clogs of the nozzle, pressure changes in the ink supply, or any other such parameters which influence ink stream position can thus be monitored.

The embodiments of the invention in which an exclusive property or privilege is claimed are defined as follows:

1. In an ink jet printer wherein a stream of drops of ink are projected through an electric field, the method of determining whether or not the path of such ink drop stream through said field is acceptable comprising:
generating signals representative of the modulation of said field as an ink drop stream passes therethrough,
establishing reference signals representative of an acceptable modulation of said field,
comparing said generated signals with said reference signals and producing output signals as a result, and
displaying said output signals.

2. In an ink jet printer of the type wherein an electric field is established and a stream of ink drops is projected through said electric field toward a substrate,
means for determining whether or not the path traversed by said ink drop stream, in passing through said electric field is proper comprising:
sensing electrode means, positioned to be within said electric field, to generate a current representative of the modulation of said electric field by said ink drop stream passing therethrough, and
means responsive to said current generated by said sensing probe means for indicating the occurrence of undesired modulation of said electric field and therefore an improper path is traversed by said ink drop stream and for producing an indication thereof.

3. In an ink jet printer as recited in claim 1 wherein said electric field is established between two deflection plates, and
said sensing probe means is positioned adjacent the downstream end of one of said two deflection plates.

4. In an ink jet printer as recited in claim 2 wherein said electric field is established between two deflection plates, one of said deflection plates having a hole therein, and said sensing probe means is positioned within said hole.

5. In an ink jet printer as recited in claim 3 wherein said sensing probe means comprises a conductive tube, and
wherein said conductive tube also functions to capture drops not desired for printing.

6. In an ink jet printer as recited in claim 2 wherein a plurality of ink jet streams are projected through said electric field and there is included means responsive to the currents generated by said sensing means for indicating whether or not each one of the plurality of ink jet streams passes through an accepted predetermined location within said electric field.

7. In an ink jet printer wherein streams of drops of ink are projected through an electric field, means for determining whether or not the path of such ink drop streams through said field is acceptable comprising:
sensing probe means positioned at a location within said field such that the field lines are modulated by passage of said ink drop stream therethrough to generate signals representative of the distance of said ink drop stream from said probe,
means for establishing reference signals representative of an acceptable distance of said ink drop stream from said sensing probe,
means for comparing said reference signals with said signals from said sensing probe means, and
means responsive to an output from said comparator to produce an indication thereof.

* * * * *